July 26, 1949.  G. L. FOGAL ET AL  2,476,969
PARACHUTE PACK
Filed July 19, 1948                           2 Sheets-Sheet 1
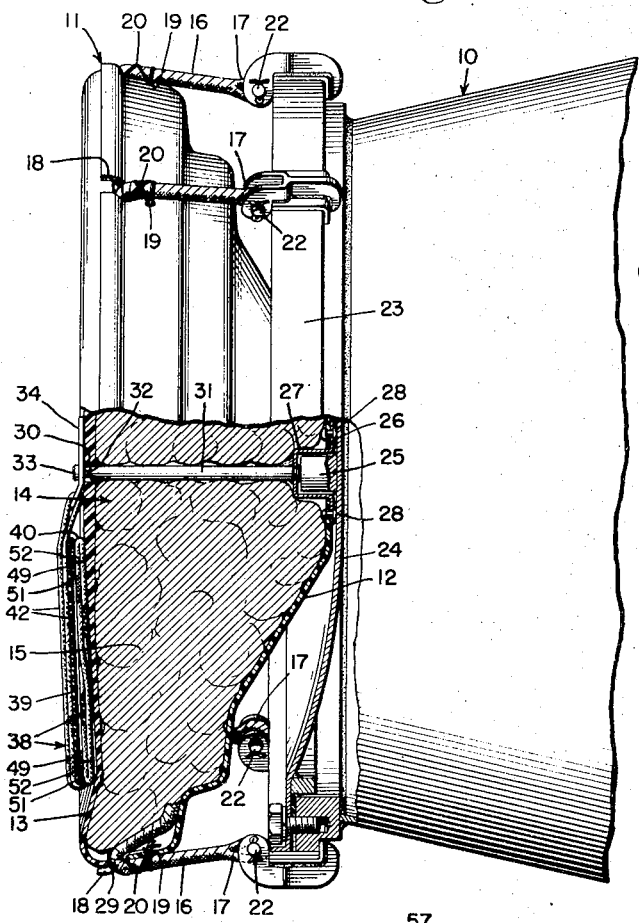
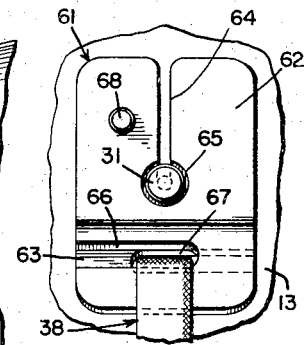
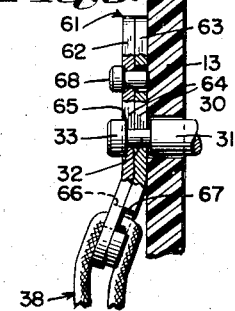
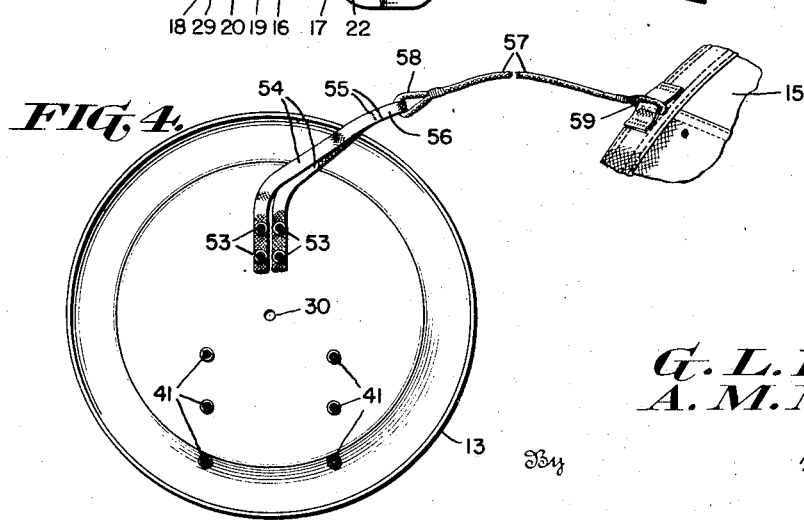
Inventors
G. L. Fogal
A. M. Mitnick
By N. C. Hayes
Attorney July 26, 1949.　　　G. L. FOGAL ET AL　　　2,476,969
PARACHUTE PACK
Filed July 19, 1948　　　　　　　　　　　　　2 Sheets-Sheet 2
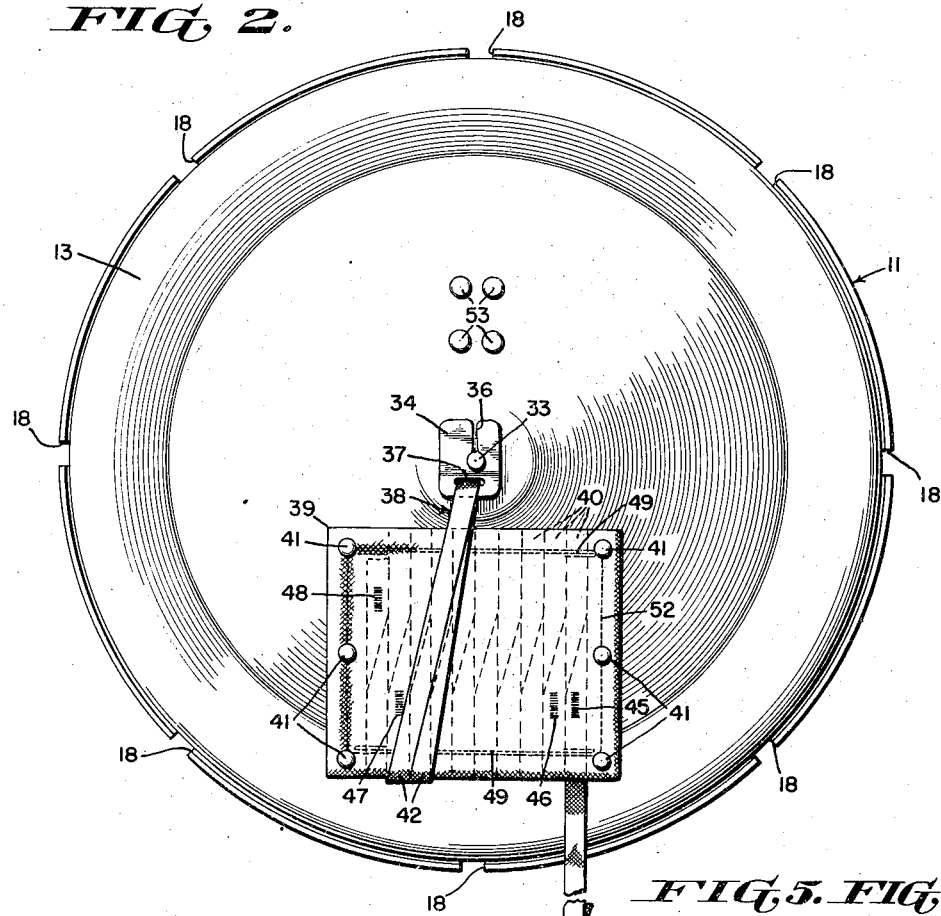
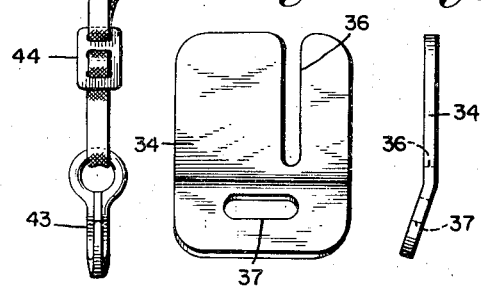
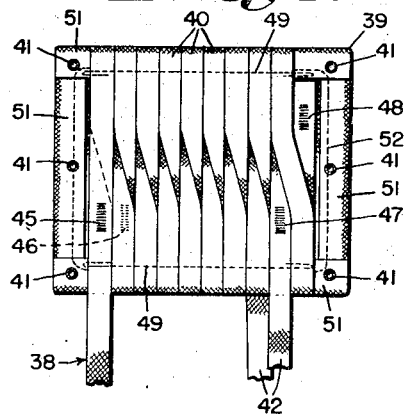
Inventors
G. L. Fogal
A. M. Mitnick
By M. C. Hayes
Attorney Patented July 26, 1949

2,476,969

UNITED STATES PATENT OFFICE 2,476,969

PARACHUTE PACK

Gordon L. Fogal and Albert M. Mitnick,
Washington, D. C.

Application July 19, 1948, Serial No. 39,574

8 Claims. (Cl. 244—148)

(Granted under the act of March 3, 1883, as
amended April 30, 1928; 370 O. G. 757)

The present invention relates to parachute packs and more particularly to parachute packs adapted for use with aerial launched mines or the like.

In parachute packs heretofore devised for use with aerially launched mines it has been found that in certain cases the static line is not initially taut and becomes prematurely loose as the result of the wind drag thereon at the high speeds of travel of modern aircraft causing the pack to be opened prematurely and the parachute to be released therefrom before the mine has been released from the aircraft and, furthermore, that a metal clip is usually secured to the free end of the static line whereby, when the parachute and mine have been released from the aircraft in flight, the slip stream of the aircraft causes the static line to whip with the result that the clip acts like a flail and damages the fuselage during the flight of the aircraft after the mine has been released therefrom.

In the device of the present invention the aforementioned difficulties have been substantially eliminated by providing the pack with a static line having means for adjustment of the length thereof after the static line has been disconnected therefrom, whereby the line is drawn taut to prevent whipping of the line in the slip stream of the aircraft sufficient to pull out an additional length of the line, thereby preventing premature opening of the pack. The pack of the present invention is further arranged in such a manner that the cover, when released, acts as a pilot to pull the parachute from the pack therefore ensuring the opening of the parachute after the mine has been secured to the aircraft. Another important advantage of the present invention is the elimination of the destruction effect of the flail action of the static cord by providing a new and improved cover retaining clip which is arranged in such a manner that the clip is detached from the static line after having been pulled clear from the retaining pin to release the cover.

An object of the present invention is to provide a new and improved parachute pack which is particularly adapted for use with mines mounted on racks of the launching aircraft.

Another object is to provide a static line for a parachute pack which is freed of dangling metallic parts at the free end thereof after the static line has been separated from the pack thereby preventing damage therefrom to the aircraft.

Still another object is to provide a new and improved latch arrangement for the cover of a parachute pack which is readily releasable and which is held positively in the latched position prior to the release thereof.

Still another object is to provide a new and improved parachute pack in which the opening of the parachute is invariably ensured after the mine is released from the launching aircraft in flight.

A further object is to provide a new and improved arrangement for stowing and releasably securing a length of static line on the cover of a parachute pack in a neat, efficient, and compact manner.

A still further object is to provide a new and improved housing for a parachute which is strong, durable, and well adapted for the purpose intended.

Other objects, advantages, and arrangements will be apparent to those skilled in the art from a consideration of the following specification, taken in connection with the accompanying drawings, in which:

Fig. 1 is a fragmentary side elevation of the tail portion of a mine having attached thereto a parachute pack in accordance with a preferred form of the present invention, the pack being partially broken away to show a portion thereof in section;

Fig. 2 is an elevation of the parachute pack as viewed from the cover end thereof;

Fig. 3 is a view of the inner face of the static line pocket, the rivets being shown in section;

Fig. 4 is a view of the inner face of the cover showing the line connecting the cover with the parachute;

Fig. 5 is a detail elevation of a preferred form of detachable clip for use with the static line;

Fig. 6 is an edge elevation of the clip of Fig. 5;

Fig. 7 is a detail elevation of a modified form of clip; and

Fig. 8 is an edge elevation of the clip of Fig. 7, parts being shown in section.

Referring more particularly to the drawings in which like numerals of reference indicate like parts throughout the several views, a mine of the type adapted to be launched from an aircraft in flight is indicated generally at 10, Fig. 1, a parachute pack in accordance with the present invention being attached thereto and indicated generally at 11. The pack 11 includes a dish-shaped housing 12 and a cover 13 therefor. Enclosed within the housing is a parachute 14 having a canopy 15 provided with a plurality of shroud lines 16 having looped ends 17.

The housing 12 is provided at the rim thereof with a plurality of notched portions 18 to accommodate the shroud lines 16. Adjacent the noches 18 pairs of openings 19 within the housing 12 are positioned. Lashings 21 are passed through openings 19, around lines 16, through notches 18 and knotted within the housing 12 thereby forming a secure fastening between the housing and each of the shroud lines. The looped ends 17 of the shroud lines are secured as at 22 to a parachute release mechanism 23 which may be of the type which automatically releases the parachute as the mine strikes a body of water.

The end plate 24 of mine 10 has mounted thereon a centering lug or post 25. Housing 12 has a centrally arranged opening 26 formed therein to receive a flanged cup-shaped member 27. Rivets 28 are used to secure the member 27 to housing 12. Member 27 fits snugly over lug 25 to center the pack 11 on the mine.

The cover 13 rests against shoulder 29 adjacent the rim of housing 12 and is provided with a centrally disposed opening 30 to receive a pin 31 secured at one end to cup-shaped member 27. Pin 31 has at the opposite end thereof a circumferential groove or reduced portion 32 defining head 33. Pin 31 is of such length that the cover 13 must be sprung slightly inwardly to position a bifurcated clip such as the clip 34 on pin 31 between head 33 and cover 13. Clip 34 is provided with an off-center slot 36 forming the bifurcation thereof, the slot accommodating reduced portion 32 of pin 31. Clip 34 also is provided with slot 37 to receive a static line 38 as will be hereinafter more fully described.

A rectangular fabric pocket 39 is fastened to the outer face of the cover 13 by rivets 41. A portion of the length of static line 38 is stowed in the pocket 39, the static line being arranged in a plurality of folds 40 in side by side relation across the width of the pocket 39. One of the loops or folds indicated at 42 extends beyond the confines of pocket 39 toward the center of cover 13, the aforementioned clip being positioned at the extremity of the fold 42.

As will be apparent from Figs. 2 and 3, static line 38 has one end thereof looped through a trigger hook 43, the loop being held in adjusted position by a fastener 44. In the use of the mine with external racks on launching aircraft it is particularly desirable to have the static line drawn taut, in order to prevent whipping of the line in the slip stream of the aircraft and thereby to obviate the danger of accidental release of the parachute before the mine is launched. It is also desirable to have line 38 taut when the mine is supported in an internal rack in order to prevent the line fouling in adjacent gear.

The aforementioned result is accomplished by the use of fastener 44 whereby the length of the static line may be adjusted to a taut condition after the trigger hook 43 is secured to the aircraft.

The static line 38 is attached to the launching aircraft by the trigger hook 43 and extends into the pocket 39, the line being detachably fastened to the pocket by bar tacking 45. The line 38 extends to the opposite side of pocket 39 where it is folded under and continues in the opposite direction to a point beside the point of entry of the line into the pocket. The line is again folded under and bar tacked as at 46. The line is continued in a series of folds across the pocket, one of the folds 42, as aforesaid, extending beyond the pocket and having the clip 34 threaded thereon. The loop 42 as it enters the pocket 39 is bar tacked thereto as at 47 and the line 38 is bar tacked thereto again at the end thereof as at 48.

The folds 40 of the line 38 are further secured to the pocket by lines of stitching 49 adjacent the ends thereof, the pocket being formed with hems 51 at the edges thereof and stitched as at 52.

Secured by rivets 53 to the cover 13 at the ends thereof is a short length of looped webbing 54. Bar tacking 55 adjacent the looped end of webbing 54 forms an eye 56. A line 57 is fastened to eye 56 at one end thereof in any well known manner such, for example, as shown at 58, Fig. 4. The other end of line 57 is fastened to the hem of the parachute canopy 14 in a manner such, for example, as at 59.

In operation the parachute pack of the present invention is attached to a mine or the like adapted to be launched from an aircraft in flight. The static line 38 is attached to the aircraft by means of the trigger hook 43, the mine being releasably supported on either an internal rack or in the fuselage an external rack on the wing of the aircraft, as the case may be. As the mine is released and falls away from the aircraft, the static line is pulled from the pocket 39 thereby severing the bar tacking 45 and progressively severing stitching 49, bar tacking 46, pulling off clip 34 from pin 31, and severing bar tacking 47 and 48 in the order named. The cover is now disconnected from the static line and the clip slides over the free end of the static line and is disconnected therefrom. As clip 34 is drawn from pin 31, cover 13 is released and moves away from housing 12, this motion of the cover relative to the housing being assisted by a pull on the static line at bar tacking 47 and 48 before the static line is disconnected from the cover. Cover 13 acts as a pilot as it moves away from housing 12 and draws webbing 54 and line 57 from housing 12. When line 57 is completely withdrawn from housing 12, parachute canopy 15 is withdrawn by the cover 13 to which a length of line from the housing is secured thereby ensuring the opening of the parachute.

If desired the bifurcated end of clip 34 may be bent in such a manner as to partially close the open end of slot 36 whereby accidental displacement of the clip is prevented.

An alternate form of clip 34 is illustrated in generally at 61. The clip comprises a pair of separable coacting plates 62 and 63 arranged in superimposed relation and each having an aligned elongated slot 64 to receive grooved portion 32 of pin 31, the uppermost slot preferably having a depression 65 to receive head 33 of pin 31. Plate 62 has a slot 66 opening to the left while plate 63 has a slot 67 opening to the right as illustrated particularly in Fig. 7.

Slots 66 and 67 coact to receive static line 38. In order to maintain the plates 62 and 63 in superimposed relation and to permit plates to separate when released a pin 68 is forced into opening 69 and fits loosely in opening 71 in 62 and 63 respectively.

Whereas clip 34 is arranged to slip off the end of static line 38 after the static line has been severed from pocket 39, plates 62 and 63 of clip 61 are arranged to separate as the clip is drawn from pin 31, thereby permitting plates 62 and 63 to fall away from the static line without the necessity of the clip travelling to the end thereof.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent is:

1. Parachute launching apparatus comprising, in combination, a dish-shaped housing, a cover for said housing, a parachute enclosed within the housing and secured at the rim thereof to said cover, means including the shroud lines of said parachute for securing the housing to a load to be launched from an aircraft in flight, means for releasably securing said cover to the housing, and a static line secured at one end thereof to said aircraft, the other end of said static line being attached to said releasable securing means whereby the cover is released from the housing after the load is launched from the aircraft.

2. Cover releasing apparatus for a parachute pack comprising, in combination, a dish-shaped housing forming a part of said pack, a cover therefor having a central bore therein, a pin centrally secured in said housing and having a head portion adapted to extend through said central bore, a bifurcated fastener for said cover adapted to be positioned between the head of said pin and the outer face of the cover, a rectangular fabric pocket fastened to the outer face of said cover adjacent said fastener, and a static line secured at one end thereof to a launching aircraft, a portion of the length thereof being stowed in said pocket in side-by-side folds, one of said folds extending beyond the confines of said pocket and having attached thereto said fastener whereby the cover is released from the housing by the fastener being withdrawn by the static line after the parachute pack is launched from the aircraft.

3. Cover releasing apparatus for a parachute pack comprising in combination, a dish-shaped housing forming a part of said pack, a cover therefor, means for releasably securing said cover to said housing, a rectangular fabric pocket fastened to the outer face of said cover adjacent said releasable securing means, a static line adapted to be secured at one end thereof to a launching aircraft, a portion of the length thereof being stowed in said pocket in side-by-side folds, one of said folds extending beyond the confines of the pocket and having attached thereto the releasable securing means and frangible stitching for releasably retaining the stowed portion of said static line within the pocket.

4. Apparatus for releasing a parachute from a closure attached to a mine adapted to be launched from an aircraft in flight and comprising, in combination, a static line having one end thereof attached to the aircraft, a rectangular fabric pocket for stowing a portion of said static line, a housing forming a part of said closure for said parachute and having a removable cover therefor, means for securing said pocket to the outer face of said cover, means including a bifurcated clip for releasably securing said cover to said housing, said clip having an opening therein, the stowed portion of said static line being arranged in side-by-side folds across the width of said pocket, and means for releasably securing said stowed portion of the static line at the folded ends thereof to the pocket, one of the loops of the stowed portion of the static line extending beyond the confines of the pocket and passing through the opening in said clip whereby when the mine is launched the folds of the static line are drawn in succession from the pocket thereby releasing said cover when the clip is withdrawn from the pin.

5. A closure for a parachute for a mine adapted to be launched from an aircraft in flight and comprising, in combination, a centering lug attached to said mine, a dish-shaped member having a central bore therein, a flanged cup-shaped member extending through said central bore and secured to said dish-shaped member and adapted to receive said lug, an elongated pin secured to said cup-shaped member and having a head portion extending beyond the confines of the dish-shaped member, a cover for said dish-shaped member having a central bore therein to receive said pin, a static line releasably stitched at an end portion thereof to said cover and secured at the other end thereof to the launching aircraft, and a clip positioned between the head portion of said pin and the outer surface of said cover, said clip being adapted to be withdrawn from said head by the static line after the mine is launched thereby to release said cover.

6. In a parachute pack adapted for use with aerial launched mines and comprising, in combination, a parachute including a plurality of lines attached thereto, means for securing said shroud lines to the mine, a dish-shaped housing for said parachute, means for securing said housing to the shroud lines, a headed pin secured in said housing and centrally disposed therein, a cover for said housing and having a centrally disposed opening to receive said pin, the head of said pin extending beyond the outer face of the cover, a pocket secured to the outer face of the cover, an adjustable static line, one end thereof being secured to the aircraft and a portion of the length thereof being folded within said pocket, said folded portion being arranged in side-by-side folds across the width of the pocket and releasably stitched to the pocket adjacent the ends of each fold, one of said folds extending a distance beyond the confines of the pocket, a clip having a slotted opening at one end thereof within which said static line is disposed, said clip being positioned at the extended loop of said one of said folds, said clip being bifurcated at the end opposite to said slot thereby to receive the headed end of said pin and releasably retain said cover on the housing, and a second line secured at one end thereof to the parachute and at the opposite end thereof to the cover whereby the cover and static line ensure the discharge of the parachute from the housing after the cover has been released from the housing by the displacement of the clip in response to a pull thereon by the static line, the cover thereafter serving as a pilot to pull the parachute from the pack.

7. A parachute pack for a mine adapted to be launched from an aircraft in flight and comprising, in combination, a parachute canopy having a plurality of shroud lines attached thereto, a dish-shaped housing for said canopy having a centrally disposed headed pin extending therethrough, said housing member having a plurality of notches at the lip thereof to permit the shroud lines to pass therethrough, said shroud lines being lashed to the housing adjacent said notches and having looped ends adapted to be secured to the mine, a cover for said housing having a centrally disposed opening therein to receive said pin, the head of said pin extending through said opening, a pocket secured to said cover, a length of static line adapted to be folded into said pocket, the free end thereof being adapted to be secured to the launching aircraft, said folds being arranged in side-by-side relation across the width of the pocket and releasably stitched adjacent the ends of each fold to the pocket, one of said folds being extended a distance beyond the confines of the pocket, a clip having a slot through which the static line passes and adapted to be positioned on the outer end of said one of said folds, said clip being bifurcated to receive the headed end of said pin thereby to releasably secure the cover on said housing, and a line secured at one end thereof to the cover and at the opposite end thereof to the hem of the canopy whereby the cover acts as a pilot to draw the canopy from the housing member when the cover has been released from the housing member by the static line.

8. Apparatus for releasing a parachute from a closure attached to a mine adapted to be launched from an aircraft in flight and comprising, in combination, a static line having one end thereof attached to the aircraft, a rectangular fabric pocket for stowing a portion of said static line, a housing forming a part of said closure and having a removable cover therefor, means for securing said pocket to the outer face of said cover, means on said housing and including a bifurcated clip for releasably securing said cover to said housing, said clip comprising, two complementary elemental portions releasably secured to said static line when the clip is secured to said cover whereby the clip is adapted to be detached from the cover in response to a pull thereon by the static line as the mine falls away from the aircraft and thereafter be detached from the static line, and dowel means for preventing relative movement between said elemental portions until the clip has been detached from said cover.

GORDON L. FOGAL.
ALBERT M. MITNICK.

No references cited.